United States Patent
Grethel et al.

(10) Patent No.: US 10,753,410 B2
(45) Date of Patent: Aug. 25, 2020

(54) FLUID ASSEMBLY

(71) Applicant: Schaeffler Technologies AG & Co. KG, Herzogenaurach (DE)

(72) Inventors: Marco Grethel, Bühlertal (DE); László Mán, Ottersweier-Unzhurst (DE); Dominik Herkommer, Schriesheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 243 days.

(21) Appl. No.: 15/763,774

(22) PCT Filed: Sep. 21, 2016

(86) PCT No.: PCT/DE2016/200442
§ 371 (c)(1),
(2) Date: Mar. 27, 2018

(87) PCT Pub. No.: WO2017/054815
PCT Pub. Date: Apr. 6, 2017

(65) Prior Publication Data
US 2018/0283475 A1  Oct. 4, 2018

(30) Foreign Application Priority Data

Sep. 29, 2015  (DE) .................. 10 2015 218 786

(51) Int. Cl.
*F16D 48/02* (2006.01)
(52) U.S. Cl.
CPC .. *F16D 48/0206* (2013.01); *F16D 2048/0236* (2013.01); *F16D 2048/0248* (2013.01)
(58) Field of Classification Search
CPC ......... F16D 48/0206; F16D 2048/0236; F16D 2048/0248; F16D 2048/0245
See application file for complete search history.

(56) References Cited

U.S. PATENT DOCUMENTS

| 3,741,360 A | 6/1973 | Patton |
| 5,884,480 A * | 3/1999 | Dahl ...................... F04B 49/08 |
| | | 60/445 |

(Continued)

FOREIGN PATENT DOCUMENTS

| CN | 202431628 U | 9/2012 |
| DE | 102004009832 A1 | 9/2004 |

(Continued)

OTHER PUBLICATIONS

International Search Report for PCT/DE2016/200442; 2 pgs; dated Jan. 5, 2017 by European Patent Office.

*Primary Examiner* — Tinh Dang
(74) *Attorney, Agent, or Firm* — Kevin L. Parks

(57) ABSTRACT

A fluid arrangement for controlling a transmission of a motor vehicle in a hydraulic circuit is disclosed. The fluid arrangement includes a dual clutch including a first sub-clutch and a second sub-clutch, wherein the first sub-clutch is configured to be actuated via a first reversing pump actuator and the second sub-clutch is configured to be actuated via a second reversing pump actuator. The first and second reversing pump actuators each have a first delivery direction and a second delivery direction for delivering a working fluid in the hydraulic circuit. A first gear ratio mechanism with a variable gear ratio for actuating the dual clutch is configured to be actuated via the first delivery direction of the first and second reversing pump actuators a and a second gear ratio mechanism with a variable gear ratio for actuating a consumer arrangement is configured to be actuated via the second delivery direction.

14 Claims, 1 Drawing Sheet

(56) References Cited

U.S. PATENT DOCUMENTS

| | | | |
|---|---|---|---|
| 9,091,040 B2 * | 7/2015 | Peterson | F16H 61/431 |
| 9,205,813 B2 * | 12/2015 | Yokota | F16H 63/3416 |
| 9,435,384 B2 * | 9/2016 | Bunder | F16H 63/18 |
| 9,624,990 B2 * | 4/2017 | Ruehle | F16H 61/688 |
| 9,803,702 B2 * | 10/2017 | Heubner | F15B 7/08 |
| 10,066,748 B2 * | 9/2018 | Watanabe | B60T 1/062 |
| 10,138,995 B2 * | 11/2018 | Herkommer | F16H 57/0436 |
| 10,408,285 B2 * | 9/2019 | Herkommer | F16H 61/688 |
| 2013/0306431 A1 * | 11/2013 | Ruehle | F16H 61/688 |
| | | | 192/219.4 |
| 2014/0033844 A1 * | 2/2014 | Rothvoss | F16H 3/16 |
| | | | 74/335 |

FOREIGN PATENT DOCUMENTS

| | | |
|---|---|---|
| DE | 102008009653 A1 | 9/2008 |
| DE | 102010047801 A1 | 5/2011 |
| EP | 2610517 A2 | 7/2013 |
| EP | 2664826 A1 | 11/2013 |
| WO | 2015/067259 A1 | 5/2015 |

* cited by examiner

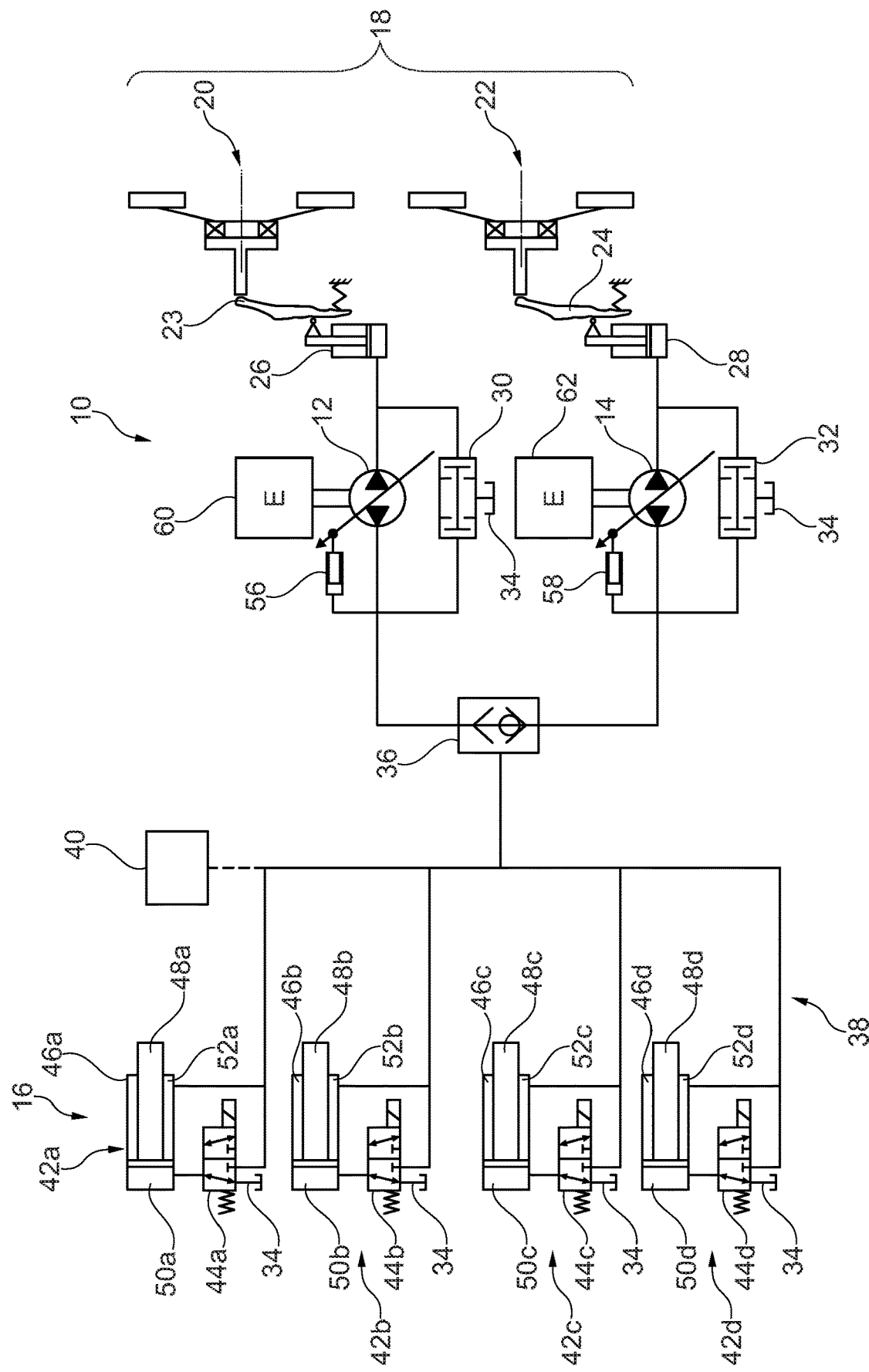

FLUID ASSEMBLY

CROSS-REFERENCE TO RELATED APPLICATIONS

This application is the U.S. National Phase of PCT Appln. No. PCT/DE2016/200442 filed Sep. 21, 2016, which claims priority to DE 10 2015 218 786.1 filed Sep. 29, 2015, the entire disclosures of which are incorporated by reference herein.

TECHNICAL FIELD

The present disclosure relates to a fluid arrangement for fluidically actuating a consumer arrangement and for fluidically actuating two sub-clutches of a dual clutch of a motor vehicle.

BACKGROUND

The unexamined German patent application DE 10 2008 009 653 A1 discloses a hydraulic arrangement for controlling a dual clutch transmission of a motor vehicle. The hydraulic arrangement comprises a hydraulic energy source for supplying the hydraulic arrangement with hydraulic energy by means of a hydraulic medium, a pressure accumulator for storing the hydraulic energy, a clutch cooling device for cooling clutches of the dual clutch transmission by means of the hydraulic medium, clutch actuators for actuating a first clutch and a second clutch, wherein the hydraulic energy source comprises a double flow electric pump. The unexamined German patent application DE 10 2010 047 801 A1 discloses a hydrostatic actuator having a master cylinder containing a housing and a piston, which is axially displaceable in the housing and applies pressure to a pressure chamber filled with pressure medium, having a planetary rolling-contact transmission which converts a rotary drive into an axial movement and has a sleeve, wherein the planetary rolling-contact transmission is driven by an electric motor.

An electronic active interlock system for dual clutch transmissions is furthermore known, with which it is possible to preselect and deselect gears in any combination in both sub-transmissions by means of common actuating elements. Only a single shift shaft having an integrated shift lever with shift finger is required here, which executes the axial and rotational movement to thereby move towards and actuate the shift rails of the transmission. When engaging a new gear, locking and ejector elements on the shift lever synchronously execute the disengagement of the previous gear and the engagement of a new gear on this sub-transmission shaft, which, without complex sensor technology, automatically prevents the engagement of two gears for each sub-transmission mechanically.

There is therefore a constant need for the fluidic actuation of a consumer arrangement, for example a transmission which comprises a plurality of gears, and the fluidic actuation of two sub-clutches of a dual clutch to be simplified.

SUMMARY

It is the object of the present disclosure to provide a fluid arrangement for fluidically actuating a consumer arrangement, for example a transmission which comprises a plurality of gears, and for fluidically actuating two sub-clutches of a dual clutch, which can simplify the fluidic actuation.

The present disclosure relates to a fluid arrangement for fluidically actuating a first sub-clutch of a dual clutch, a second sub-clutch of the dual clutch and a consumer arrangement of a motor vehicle in a hydraulic circuit, wherein the first sub-clutch of the dual clutch can be actuated via a first reversing pump actuator, wherein the second sub-clutch of the dual clutch can be actuated via a second reversing pump actuator, wherein the first reversing pump actuator and the second reversing pump actuator each have a first delivery direction and a second delivery direction, opposing the first delivery direction, for delivering a working fluid in the hydraulic circuit, wherein a first gear ratio mechanism with a variable gear ratio for actuating the dual clutch can be actuated via the first delivery direction of the first reversing pump actuator and the second reversing pump actuator and a second gear ratio mechanism with a variable gear ratio for actuating the consumer arrangement can be actuated via the second delivery direction, wherein the first gear ratio mechanism and the second gear ratio mechanism are different.

The reversing pump actuators can preferably be fluid pumps which can be operated in opposing delivery directions. The fluid pumps can be in particular hydraulic pumps, which are operated with a working medium, such as hydraulic oil, engine oil or transmission oil. The hydraulic pumps are preferably constructed as displacement-type pumps. The hydraulic pumps can be designed as vane pumps, gearwheel pumps or piston pumps. To drive the reversing pump actuators, each reversing pump actuator is driven by a pump drive, advantageously by an electric motor. In a first delivery direction, the reversing pump actuators can be used for example to actuate, in particular to close, one of the sub-clutches. In a second delivery direction, the reversing pump actuators can be used for example to actuate a consumer arrangement, for example a transmission actuator device. The sub-clutches of the dual clutch can be actuated via the first gear ratio mechanism here and the transmission actuator device can be actuated via the second gear ratio mechanism. The sub-clutches can be designed for wet-running or dry-running. With the aid of the first gear ratio mechanism and the second gear ratio mechanism, it is possible to enable a variable gear ratio, in particular a non-linearity, in the actuating section during the clutch actuation and during the actuation of the consumer arrangement. The fluid arrangement can thus be optimized in such a way that it is possible to reduce the necessary size of the pump drive, in particular the electric motor. Furthermore, the actuating dynamics in the fluid arrangement can be increased by the use of the gear ratio mechanisms. Braking devices, stroke adjusting devices or transmissions can be used for example as gear ratio mechanisms.

In particular, the reversing pump actuators can have two connections. A fluidic AND valve can be connected to the two connections, which AND valve can have, as a third connection, a connection to a reservoir for the working medium. The AND valves are also known as two-pressure valves and enable different transmission functions irrespective of the direction of rotation in a particularly advantageous manner.

As a result of a fluid arrangement of this type, the actuating times for fluidically actuating a consumer arrangement and a dual clutch transmission can be further reduced, whilst the costs and the energy requirement for the fluid actuation are not significantly increased. A fluid arrangement for a transmission control for fluidically actuating two sub-clutches of a dual clutch and a consumer arrangement can thus be simplified.

It is preferred that the first reversing pump actuator and the second reversing pump actuator each have a load-dependent delivery stroke adjustment, wherein the delivery stroke adjustment is designed in such a way that the delivery stroke adjustment can act in the direction of the second delivery direction to form the second gear ratio mechanism. It is possible to simplify a construction of the reversing pump actuator through a reversing pump actuator in which a delivery stroke adjustment is not effective in the first delivery direction.

A setting device for adjusting the delivery volume of the respective reversing pump actuator is preferably acted upon by an outlet pressure of the reversing pump actuator via a control line. The control or regulation of the setting device can thus be simplified considerably. A fluid-tight resistance device, for example a damping orifice, can preferably be arranged in the control line.

In a preferred embodiment, the first gear ratio mechanism comprises a first lever actuator mechanism for the first sub-clutch and a second lever actuator mechanism for the second sub-clutch. The term lever actuator mechanism describes a lever system here, in which the lever arms do not have unalterable lever lengths. This can be implemented in such a way that a force effect on a first side of the lever arm is realized by means of an energy accumulator, for example designed as a plate spring. The first side of the lever arm can therefore be determined by the respective position of the pivot point. The second side of the lever arm can implement the force effect on the sub-clutch. In a rest position of the lever system, an alterable pivot point can be located in the vicinity of the energy accumulator. If a sub-clutch is now to be closed, this pivot point can be moved to the lever end whereof the force effect can act on the clutch. Owing to the lever principles, the lever system is therefore initially unable to apply substantially any force. However, if the pivot point of this lever system is located far away from the energy accumulator, or in other words near to the end which acts on the sub-clutch, then a substantial force is available to the lever system. An embodiment of a lever actuator mechanism of this type is disclosed in DE 10 2004 009 832 A1, the content of which is hereby taken into account in its entirety. An actuation hysteresis of the clutch can be reduced by a lever actuator mechanism of this type.

It is preferred that the first lever actuator mechanism and the second lever actuator mechanism each comprise a hydraulic cylinder for actuating the respective lever actuator mechanism. By using a hydraulic cylinder, the action point of an actuating force can be shifted along a lever axis in a simple manner.

The consumer arrangement can preferably be connected to the first reversing pump actuator and/or the second reversing pump actuator via a valve arrangement, in particular via an OR valve. By means of the OR valve, it can be possible, in a simple manner, for the respective reversing pump actuator which is not directly involved in the actuation of an associated sub-clutch to supply a delivery flow and a delivery pressure to the consumer arrangement.

In a preferred embodiment, the consumer arrangement is a hydraulic gear selector piston arrangement. The gear selector piston arrangement can comprise a plurality of cylinder-piston units here, which can each be actuated via a valve circuit, for example a directional valve. The pistons of the cylinder-piston units can be differential area pistons or equal area pistons. A gear of a transmission can be selected or shifted via each piston of the gear selector piston arrangement. The compatibility with hydraulically actuable transmission structures can be increased by using a gear selector piston arrangement.

It is preferred that the consumer arrangement comprises a first consumer, in particular a gear selector piston arrangement, and a second consumer. It is thus possible for a plurality of consumers of a consumer arrangement to be actuated at the same time or in succession by the second delivery device of the reversing pump actuators.

The second consumer is preferably a transmission arrangement or parking lock.

In a preferred embodiment, the first consumer and the second consumer can be actuated via a valve device, in particular via an OR valve or a directional valve, wherein the valve device can be connected to the valve arrangement for connecting the first consumer and/or the second consumer to the first reversing pump actuator or the second reversing pump actuator.

BRIEF DESCRIPTION OF THE DRAWINGS

The present disclosure is explained by way of example below with reference to the accompanying drawing with the aid of a preferred exemplary embodiment, wherein the features illustrated below can represent an aspect of the present disclosure both individually in each case and in combination. The drawing shows:

FIG. 1 a simplified illustration of a fluid arrangement having two reversing pump actuators for fluidically actuating a dual clutch and a consumer arrangement.

DETAILED DESCRIPTION

In FIG. 1, a fluid arrangement in the form of a transmission control 10 having a first reversing pump actuator 12 and a second reversing pump actuator 14 is illustrated in a simplified manner. Reversing pump actuators 12 and 14 may also be referred to as reversible pump actuators. The reversing pump actuators 12 and 14 are fluid pumps which, as indicated by the double-headed arrow, can be operated in opposing delivery directions. The reversing pump actuators 12 and 14 enable the actuation of a dual clutch 18 and a consumer arrangement 16 in a particularly simple manner.

The dual clutch 18 comprises a first sub-clutch 20 and a second sub-clutch 22. The first sub-clutch 20 of the dual clutch 18 can be actuated by the first reversing pump actuator 12. The second sub-clutch 22 of the dual clutch 18 can be actuated by the second reversing pump actuator 14. The clutch actuation of the first sub-clutch 20 takes place via a first lever actuator 23 and the clutch actuation of the second sub-clutch 22 takes place via a second lever actuator 24. A first hydraulic cylinder 26 and a second hydraulic cylinder 28 serve as a drive for the lever actuator mechanism. The first hydraulic cylinder 26 is connected to the first reversing pump actuator 12 via a hydraulic line and the second hydraulic cylinder 28 is connected to the second reversing pump actuator 24 via a hydraulic line. An actuation of the sub-clutch 20, 22 here can take place in such a way that a hydraulic cylinder piston can be moved axially in the hydraulic cylinder 26, 28 depending on the medium in the hydraulic cylinder 26, 28 in order to actuate the first lever actuator 23 or the second lever actuator 24.

A first AND valve 30 is associated with the first reversing pump actuator 12 and a second AND valve 32 is associated with the second reversing pump actuator 14. The first AND valve 30 and the second AND valve 32 are each also known as a two-pressure valve. The AND valves 30, 32 each have two connections with which the AND valves 30, 32 are connected to the respective connections of the associated reversing pump actuator 12, 14. As a third connection, the first AND valve 30 and the second AND valve 32 each comprise a connection to a reservoir 34 for providing a working medium, such as a hydraulic oil, for the hydraulic circuit. The reservoir 34 can be a different working medium accumulator or the same working medium accumulator in each case.

As a result of the AND valve 30, 32 or two-pressure valve, it is possible, in a simple manner, that different transmission functions depending on the direction of rotation can be realized by means of the reversing pump actuators 12, 14. The consumer arrangement 16 is coupled to the two reversing pump actuators 12, 14 via an OR valve 36 or shuttle valve. The reversing pump actuator 12, 14 which is not directly involved in the actuation of the associated sub-clutch 20, 22 can thus supply the consumer arrangement 16 with a delivery flow and a delivery pressure.

The consumer arrangement 16 comprises a first consumer in the form of a hydraulic gear selector piston arrangement 38 and a second consumer 40, for example a parking brake. In this exemplary embodiment, the gear selector arrangement 38 comprises four gear selector pistons 42a, 42b, 42c, 42d which are each connected to a valve control 44a, 44b, 44c, 44d. The valve control 44a, 44b, 44c, 44d is designed as a directional valve. Each of the gear selector pistons 42a, 42b, 42c, 42d comprises a cylinder 46a, 46b, 46c, 46d in which a piston 48a, 48b, 48c, 48d can be axially displaced in the cylinder 46a, 46b, 46c, 46d for selecting a gear. The piston 48a, 48b, 48c, 48d divides the interior of the cylinder 46a, 46b, 46c, 46d into a first pressure chamber 50a, 50b, 50c, 50d and a second pressure chamber 52a, 52b, 52c, 52d. The first pressure chamber 50a, 50b, 50c, 50d is connected in each case to the valve control 44a, 44b, 44c, 44d and the second pressure chamber 52a, 52b, 52c, 52d, is connected to the hydraulic circuit.

The valve control 44a, 44b, 44c, 44d has two switch positions in each case. A first switch position connects the first pressure chamber 50a, 50b, 50c, 50d to a reservoir 34 in each case. The reservoir 34 can be either an individual reservoir in each case or a common continuous reservoir. A second switch position connects the first pressure chamber 50a, 50b, 50c, 50d to the hydraulic circuit. In the first switch position, the piston 48a, 48b, 48c, 48d is moved in the direction of the first pressure chamber 50a, 50b, 50c, 50d in order to disengage a gear for example. In the second switch position, the piston 48a, 48b, 48c, 48d is moved in the direction of the second pressure chamber 52a, 52b, 52c, 52d in order to engage a gear.

At the side directed towards the consumer arrangement 16, the reversing pump actuator 12, 14 is connected in each case to an adjusting mechanism 56, 58. The adjusting mechanism 56, 58 is illustrated as a piston-cylinder unit and regulates the volumetric flow of the medium delivered by the reversing pump actuator 12, 14 in the direction of the consumer arrangement 16. This occurs in that the adjusting mechanism 56, 58 is coupled in each case to the load or to the pressure on the transmission actuator device 16 and thus transmits a counter force or a counter pressure to the respective reversing pump actuator 12, 14. The adjusting mechanism 56, 58 for adjusting the delivery volume of the respective reversing pump actuator 12, 14 is acted upon by an outlet pressure of the reversing pump actuator 12, 14 via a control line. The reversing pump actuator 12, 14 here is driven in each case with the aid of a pump drive 60, 62, an electric motor in this exemplary embodiment, in order to actuate either a sub-clutch 20, 22 or the consumer arrangement 16. The adjusting mechanism 56, 58 is a load-pressure-dependent delivery stroke adjustment, wherein the stroke adjustment only acts in the direction of the consumer arrangement 16.

LIST OF REFERENCE SIGNS

10 Fluid arrangement
12 First reversing pump actuator
14 Second reversing pump actuator
16 Transmission actuator device
18 Dual clutch
20 First sub-clutch
22 Second sub-clutch
23 First lever actuator
24 Second lever actuator
26 First hydraulic cylinder
28 Second hydraulic cylinder
30 First valve logic circuit
32 Second valve logic circuit
34 Reservoir
36 OR valve
38 Hydraulic gear selector piston arrangement
40 Consumer
42a, b, c, d Gear selector piston
44a, b, c, d Valve control
46a, b, c, d Cylinder
48a, b, c, d Piston
50a, b, c, d First pressure chamber
52a, b, c, d Second pressure chamber
56 Adjusting mechanism
58 Adjusting mechanism
60 Pump drive
62 Pump drive

The invention claimed is:

1. A fluid arrangement for controlling a transmission of a motor vehicle in a hydraulic circuit, comprising:
    a dual clutch including a first sub-clutch and a second sub-clutch,
    wherein the first sub-clutch of the dual clutch is configured to be actuated via a first reversible pump actuator,
    wherein the second sub-clutch of the dual clutch is configured to be actuated via a second reversible pump actuator,
    wherein the first reversible pump actuator and the second reversible pump actuator each have a first delivery direction and a second delivery direction, opposing the first delivery direction, for delivering a working fluid in the hydraulic circuit,
    wherein a first gear ratio mechanism with a variable gear ratio for actuating the dual clutch is configured to be actuated via the first delivery direction of the first reversible pump actuator and the second reversible pump actuator and a second gear ratio mechanism with a variable gear ratio for actuating a consumer arrangement is configured to be actuated via the second delivery direction,
    wherein the first gear ratio mechanism and the second gear ratio mechanism are different; and
    wherein the first gear ratio mechanism comprises a first lever actuator mechanism for the first sub-clutch and a second lever actuator mechanism for the second sub-clutch.

2. The fluid arrangement as claimed in claim 1, wherein the first reversible pump actuator and the second reversible pump actuator each have a load-dependent delivery stroke adjustment, wherein the delivery stroke adjustment is configured such that the delivery stroke adjustment can act in the direction of the second delivery direction to form the second gear ratio mechanism.

3. The fluid arrangement as claimed in claim 2, wherein an adjusting mechanism for adjusting a delivery volume of a respective reversible pump actuator is acted upon by an outlet pressure of the respective reversible pump actuator via a control line.

4. The fluid arrangement as claimed in claim 1, wherein the first lever actuator mechanism and the second lever actuator mechanism are each connected to a hydraulic cylinder for actuating a respective lever actuator mechanism.

5. The fluid arrangement as claimed in claim 1, wherein the consumer arrangement is configured to be connected to the first reversible pump actuator or the second reversible pump actuator via a valve arrangement.

6. The fluid arrangement as claimed in claim 1, wherein the consumer arrangement is a hydraulic gear selector piston arrangement.

7. The fluid arrangement as claimed in claim 1, wherein the consumer arrangement comprises a first consumer and a second consumer.

8. The fluid arrangement as claimed in claim 7, wherein the second consumer is a transmission arrangement or parking lock.

9. The fluid arrangement as claimed in claim 7, wherein the first consumer and the second consumer are configured to be actuated via a valve device, wherein the valve device can be connected to a valve arrangement for connecting the first consumer or the second consumer to the first reversible pump actuator or the second reversible pump actuator.

10. The fluid arrangement as claimed in claim 5, wherein the valve arrangement is a shuttle valve.

11. A fluid arrangement for transmission control of a motor vehicle in a hydraulic circuit, comprising:
  a dual clutch including a first sub-clutch and a second sub-clutch, wherein the first sub-clutch is actuated via a first reversible pump actuator and the second sub-clutch is actuated via a second reversible pump actuator, the first reversible pump actuator and the second reversible pump actuator each having a first delivery direction and a second delivery direction opposite the first delivery direction for delivering a working fluid in the hydraulic circuit;
  a consumer arrangement including a first consumer and a second consumer actuated via a valve device, wherein the valve device is configured to connect the first consumer to the first reversible pump actuator and the second consumer to the second reversible pump actuator;
  a first valve connected in parallel with the first reversible pump actuator; and
  a second valve connected in parallel with the second reversible pump actuator, wherein the first valve and the second valve each have two connections connected to the first valve and the second valve, respectively, and a third connection connected to a reservoir for providing the working fluid for the hydraulic circuit.

12. The fluid arrangement of claim 11, further comprising:
  a first gear ratio mechanism having a variable gear ratio for actuating the dual clutch, the first gear ratio mechanism being configured to be actuated via the first delivery direction of the first reversible pump actuator and the second reversible pump actuator; and
  a second gear ratio mechanism having a variable gear ratio for actuating the consumer arrangement, the second gear ratio mechanism being configured to be actuated via the second delivery direction.

13. The fluid arrangement of claim 11, wherein the first consumer is a hydraulic gear selector piston arrangement and the second consumer is a parking brake.

14. The fluid arrangement of claim 13, wherein the hydraulic gear selector piston arrangement comprises a plurality of gear selector pistons each connected to a valve control device, wherein each gear selector piston comprises a cylinder in which a piston can be axially displaced in the cylinder for selecting a gear.

* * * * *